US005624714A

United States Patent [19]
Gaveske

[11] Patent Number: 5,624,714
[45] Date of Patent: *Apr. 29, 1997

[54] METHOD FOR WATERPROOFING RIGID STRUCTURAL MATERIALS

[75] Inventor: John H. Gaveske, Shakopee, Minn.

[73] Assignee: Poly-Wall International, Inc., Minneapolis, Minn.

[*] Notice: The term of this patent shall not extend beyond the expiration date of Pat. No. 5,482,737.

[21] Appl. No.: 632,855

[22] Filed: Apr. 16, 1996

Related U.S. Application Data

[62] Division of Ser. No. 258,558, Jun. 6, 1994, abandoned, which is a division of Ser. No. 982,851, Nov. 30, 1992, abandoned.

[51] Int. Cl.$^6$ .................................. B05D 3/02; B05D 5/00
[52] U.S. Cl. .................. 427/393.6; 427/140; 427/393.4
[58] Field of Search .............................. 427/393.6, 140, 427/403, 407.1, 393.4

[56] References Cited

U.S. PATENT DOCUMENTS

| | | | |
|---|---|---|---|
| 2,470,918 | 7/1949 | Chung | 117/123 |
| 2,491,487 | 12/1949 | Faulwetter | 52/DIG. 7 |
| 2,716,619 | 8/1955 | Jobbins et al. | |
| 3,423,224 | 1/1969 | Schmidt et al. | 427/136 |
| 3,600,214 | 8/1971 | Nichols, Jr. et al. | 161/38 |
| 3,720,538 | 3/1973 | Bergmeister et al. | 427/407.1 |
| 3,721,640 | 3/1973 | Wilheim et al. | 260/31.2 N |
| 3,814,619 | 6/1974 | Kobayashi et al. | 117/62 |
| 3,854,985 | 12/1974 | Suzuki et al. | 117/11 D |
| 3,861,944 | 1/1975 | Steinberg et al. | 117/72 |
| 3,869,415 | 3/1975 | Williams | 260/17 R |
| 3,939,692 | 2/1976 | Offerman | 260/7.5 |
| 3,967,012 | 6/1976 | Ebner | 427/380 |
| 4,141,737 | 2/1979 | Moon et al. | 106/12 |
| 4,196,259 | 4/1980 | Augustin et al. | 427/393.6 |
| 4,362,586 | 12/1982 | Uffner et al. | 427/407.1 |
| 4,379,857 | 4/1983 | Hansen et al. | 521/54 |
| 4,403,059 | 9/1983 | Laut et al. | 524/399 |
| 4,435,472 | 3/1984 | Leah | 428/333 |
| 4,474,833 | 10/1984 | Maxfield | 427/393.6 |
| 4,478,912 | 10/1984 | Uffner et al. | 428/349 |
| 4,482,382 | 11/1984 | Kanayama et al. | 106/90 |
| 4,489,109 | 12/1984 | Puskar | 427/230 |
| 4,507,365 | 3/1985 | Lower et al. | 428/489 |
| 4,536,417 | 8/1985 | Shumizu | 427/140 |
| 4,537,921 | 8/1985 | Uffner et al. | 524/59 |
| 4,582,730 | 4/1986 | Elser et al. | 427/393.6 |
| 4,613,649 | 9/1986 | Saeki et al. | 524/650 |
| 4,714,507 | 12/1987 | Ohgushi | 156/91 |
| 4,804,693 | 2/1989 | Harvey et al. | 427/393.6 |
| 4,937,033 | 6/1990 | Oshio et al. | 264/256 |
| 5,028,487 | 7/1991 | Kindt et al. | 428/489 |
| 5,124,182 | 6/1992 | Kubo et al. | 427/393.6 |
| 5,482,737 | 1/1996 | Gaveske | 427/140 |
| 5,512,619 | 4/1996 | DeWacker et al. | 427/403 |
| 5,534,303 | 7/1996 | Roberts et al. | 427/385.5 |
| 5,576,062 | 11/1996 | Gaveske | 427/393.6 |
| 5,576,065 | 11/1996 | Gaveske | 427/407.1 |

FOREIGN PATENT DOCUMENTS

| | | | |
|---|---|---|---|
| 2029243 | 12/1971 | Germany. | |
| 205085 | 12/1983 | Germany. | |
| 62-210076 | 9/1987 | Japan | 427/393.6 |
| 5021020 | 3/1995 | Japan | 427/393.6 |
| 914605 | 3/1982 | U.S.S.R. | 427/393.6 |

OTHER PUBLICATIONS

Technical Bulletin Pigments, "Aerosil® for Lacquers and Paints", No. 68 (May 1986); Degussa Corporation.
Technical Bulletin Pigments, "Aerosil® as a Thickening Agent for Liquid Systems", No. 23 (Jul. 1989); Degussa Corporation.
DuPont, "Tetrahydrofuran: Properties, Uses, Storage and Handling" (Dec. 1991).
DuPont Chemicals, Material Safety Data Sheet, "Tetrahydrofuran", (May 31, 1992).
Polymer Technology, Chapter 11, "Polystyrene and Copolymers", Chemical Publishing Inc., New York, N.Y., 284–317 (1979). no month.
Discover™, Monthly Report, (Oct. 1992).
Goodyear Chemicals, Pliolite Resins in Waterproofing Sealers, Sep. 1975.

*Primary Examiner*—Diana Dudash
*Attorney, Agent, or Firm*—Merchant, Gould, Smith, Edell, Welter & Schmidt

[57] ABSTRACT

A coating for waterproofing and sealing a rigid structural unit using a styrene polymeric film cast from an organic solvent is disclosed. The coating is easily maintained as damaged areas and imperfections can be repaired by simply applying additional liquid composition to the damaged area, and the liquid composition remelts the existing film allowing the newly formed film to be continuous. In addition, the composition can be applied to structural units in subfreezing temperatures or to wet surfaces. Methods relating to the use of the liquid coating composition are also disclosed.

4 Claims, No Drawings

METHOD FOR WATERPROOFING RIGID STRUCTURAL MATERIALS

This is a divisional of application Ser. No. 08/258,558, filed Jun. 6, 1994, now abandoned which is a divisional of Ser. No. 07/982,851, abandoned, filed on Nov. 30, 1992, now abandoned which application(s) are incorporated herein by reference.

FIELD OF THE INVENTION

This invention relates generally to the field of waterproofing and sealing rigid structures. In particular, the invention relates to a method of waterproofing and sealing a rigid structural unit using a styrene polymeric film cast from an organic solvent.

BACKGROUND OF THE INVENTION

Masonry structures are porous and are susceptible to cracking due to distortion caused by movement of their foundation, vibration, and/or drying out subsequent to their construction. In addition, below grade structures are often subjected to hydrostatic pressure from ground water. Therefore, waterproofing and sealing below grade masonry structures have been major concerns for a number of years. Masonry structures have been coated with various tar-based and asphaltic compositions. These compositions are relatively inexpensive and can be applied year-round if heated to a pliable state. However, these compositions generally contain leachable components which can contaminate the surrounding soil. In addition, these compositions contain substantial amounts of organic materials which are attacked by soil- and water-borne microorganisms and have a short useful life before decomposition of substantial pathways through the coatings.

Numerous synthetic coatings, such as acrylic, polyurethane and rubber-based or rubberized coatings, and more elaborate waterproofing/sealing systems based on polyvinyl and polyethylene sheeting have been developed to address the shortcomings of the tar-based and asphaltic compositions. Many of the coating compositions are aqueous emulsions or latexes of the polymeric resins. The resulting films generally are short-lived as they are subject to degradation caused by soil acids and microorganisms. These compositions have generally resulted in effective application systems only when applied under non-freezing conditions. To reduce attack on acrylic coatings, including rubberized acrylic, antifungal components are often included in the compositions. However, these components can leach into the soil and may be only temporarily effective.

Rubberized coatings generally provide fragile membranes which are easily damaged and ruptured during further work and backfilling around the masonry structures and may be easily oxidized. Rubberized acrylic, water-based coatings are not effective for application at below freezing temperatures, and can suffer from microorganism attack. Other rubberized coatings include rubberized asphalt which suffers from the inclusion of organic impurities which can be attacked and decomposed by microorganisms. In addition, the rubberized coatings cannot easily be applied by brush or roller.

Polyurethane compositions generally result in unstable coatings due to plasticizer migration and exposure to sunlight to result in brittle and friable coatings. Once applied, many polyurethanes continue to evolve formaldehyde vapors which are highly undesirable. These compositions are often foamed and applied as insulating coatings.

The waterproofing/sealing systems based on polyvinyl and polyethylene sheeting generally have open seams and, generally require black mastics or metal fasteners such as nails, etc., to adhere the sheeting to the masonry surfaces. The sheets are usually UV-sensitive and can be susceptible to fungus and insect attack. In addition, the sheets are difficult to form around non-uniform surfaces, and the nails puncture the sheet and may puncture cement blocks to provide a direct water channel into the interior of the block wall.

Beyond the problems discussed above, the state of the art coating compositions are generally fragile, and they must be protected during backfilling of earth around the masonry structures. Without such protection, the sheets or coatings can be ruptured, torn, pulled down along vertical surfaces by the backfill, etc. Further, many of these coating systems require that the masonry structure be dry or contain only a trace of dampness which requires careful protection of the structure before application of the waterproofing/sealing system.

Recently crystallizing waterproofing products have become available from producers such as AKONA, BONDEX and Xypex Chemical Corporation. These compositions generally are powders which include Portland cement, silica sand and other active chemicals. The compositions are applied as a slurry in water to concrete surfaces, and they penetrate cracks and pores in concrete and other cementitious structures. When the compositions cure, they generally form a crystalline coating which reacts with and bonds to cementitious surfaces. While these compositions are generally very effective, they require careful application to perform up to their designed specifications. Careful preparation of the surfaces and the use of two or more coats of slightly different layers are necessary to ensure complete waterproofing of the structure. In addition to the labor intensive application, the compositions themselves are rather expensive, and therefore, the system is rather costly to apply. Thus these systems are of rather limited use where very high performance is required to justify the cost.

Therefore, a new, low cost, waterproof sealant is needed for use in a majority of waterproofing applications which is durable and has a long effective life span. In addition, a new method of waterproofing and sealing subterranean masonry structures is needed which is useful year round, even in northern latitudes, and which can be applied to wet masonry surfaces.

SUMMARY OF THE INVENTION

To overcome the deficiencies in the current methods of waterproofing and sealing rigid structural units, a new procedure has been developed. The procedure includes the steps of applying a liquid coating composition to the structural unit, and drying the liquid composition to form a film having an average water vapor permeability of less than about $1*10^{-2}$ perms-inch. The liquid coating composition is a styrene polymeric resin in an organic solvent. In one embodiment, the liquid coating composition is combination of about 100 parts by weight of a styrene polymeric resin binder; about 150 to 400 phr of an organic solvent; about 0 to 50 phr of a plasticizer; about 0 to 200 phr of a filler; and about 0 to 100 phr of a particulate solid selected from the group consisting of an opacifying agent and a pigment.

The procedure can also include the step of filling defects in the structural unit with a liquid composition comprising a polystyrene resin and portland cement in an organic solvent. This particular liquid composition is very compatible with the liquid waterproofing/sealing composition, and it can be covered with the waterproofing/sealing composition with little delay.

The procedure is operable over a wide range of temperatures, from well below freezing to in excess of 100° F., and to surfaces which are wet or dry. Further, the resulting coating is tough, and adheres strongly to the masonry structure. In addition, the waterproofing/sealing composition rapidly dries to a coating layer which can be backfilled without any protective devices or layers.

It has also been discovered that the waterproofing coating is very versatile. The coating can be used to waterproof below grade masonry structures as discussed above, and it can also be used to form a protective, waterproof coating on other rigid structural materials such as bathroom walls, tub and shower enclosures, pool enclosures, car wash facilities, etc. The coating can be the only coating, or it can be overlaid with tiles, painted, or otherwise decorated.

As used herein the specification and the claims, the phrase "a rigid structural unit" is intended to include the following, non-limiting list of rigid structural materials such as wood, metal, stone and stone products, concrete and concrete products, composite materials, brick, tile, terra-cotta, and the like. In addition, the term "masonry" is intended to include the following, non-limiting list of inorganic materials such as stone and stone products, concrete and concrete products, clay products, brick, tile, terra-cotta, and the like. The unit of measure "phr" is a weight based measurement of parts of a particular component based on 100 parts by weight of the binder component in the composition.

DETAILED DESCRIPTION OF THE INVENTION

Rigid Structural Units

The present invention is useful in methods for protecting subterranean masonry structures. These masonry structures may be foundations, basement walls, retaining walls, cement posts, and the like. The structures may include poured concrete, block and mortar, and the like. The masonry structures may ultimately be completely buried, or may be partially exposed to the atmosphere. The masonry structures may or may not comprise reinforcing bars, rod, mesh, and the like.

The invention also relates to waterproofing and protecting other rigid structural units such as bathroom walls, tub and shower enclosures, pool enclosures, car wash facilities, highway structures (including wood and cementitious), wooden portions of semi-trailer beds, wooden fence posts and other wooden structures which may be buried in soil such as foundations which can be subjected to chemical attack from fertilizers, farm chemicals, etc. Basically, the invention is useful to waterproof structures which are less flexible than the coating itself. In other words, if the waterproof coating which results from the application of the liquid coating composition is slightly more flexible and elastic than the surface to be coated, the movement of that surface after application of the coating will not cause cracks in the coating. Therefore, the coating will remain an effective water barrier. While the invention is particularly useful in waterproofing building foundations, it can be used to waterproof structural units wherever the use of the volatile organic carrier is acceptable.

In one embodiment, the masonry structure comprises the foundation and basement walls of a residential or commercial building. These structures generally are formed in excavations in the earth, and may be built under diverse weather and temperature conditions. Generally, the structures are exposed to all weather conditions prior to backfilling or other protection.

The structures may also have defects which require filling prior to coating. Such defects can be cracks and fissures, and they can be a result of concrete form ties, cold joints in concrete, and the like.

Waterproofing/Sealing Coating Composition

The liquid coating composition comprises a styrene polymeric resin binder in an organic solvent. In a preferred embodiment, the liquid coating composition is combination of about 100 parts by weight of a binder resin comprising a styrene polymer; about 150 to 400 phr of an organic solvent; about 0 to 50 phr of a plasticizer; about 0 to 200 phr of a filler; and about 0 to 100 phr of a particulate solid selected from the group consisting of an opacifying agent and a pigment.

The resin binder may be a styrene homopolymer (polystyrene), a copolymer including styrene, a mixture of polystyrene and one or more polymers, or a combination of the above. The styrene copolymer may comprise a styrene and a rubbery diene co-monomer including isoprene, butadiene, and the like, or it may comprise co-monomers such as acrylonitrile, acrylates, olefins such as butylene, and the like. These copolymers may be random or block copolymers. The styrene polymeric resin can be a general purpose grade, crystalline, high impact, or moderate impact grade of polystyrene. Increasing amounts of styrene copolymers such as styrene-butadiene and styrene-isoprene tend to increase the difficulty in completely dissolving the binder resin, but it is possible to use high impact polystyrene and moderate impact polystyrene resins in the present invention. Preferably, the styrene resin comprises a general purpose grade or moderate impact grade of polystyrene.

A non-limiting list of other polymers which may be mixed with the styrene polymer to form the binder resin includes polypropylene oxide; vinyl polymers such as polyvinyl chloride, polyvinylpyrrolidone, and ethylenevinyl acetate; polyvinylidene chloride; polyethylene; poly(ethyl ether); acrylics; acrylates, methacrylates, and methacrylate copolymers; and the like.

Preferably the styrene resin forms at least about 85 wt-% of the polymeric binder resin, more preferably, at least about 90 wt-%, and most preferably, at least about 95 wt-% of the polymeric binder resin. If the proportion of styrene resin is too low, it may be difficult to completely dissolve the binder resin in the selected solvent. In addition, too small a proportion of styrene in the binder resin may reduce the remelting of the waterproofing film in repair operations discussed below.

The styrene polymeric resin used in the present invention may be modified by plasticizers, coupling agents, and the like. Such modified resins include high impact polystyrene such as styrene-butadiene modified high impact and medium impact polystyrene.

The resin binder may be virgin resin, reground resin, recycled resins, or a mixture thereof. Again, the styrene polymeric resin may be mixed with other resins such as styrene-butadiene rubbers, and the like, to increase the toughness of the resulting film.

Preferably, the resin binder is a styrene polymeric resin having at least 85 wt-% styrene homopolymer. More preferred, the styrene polymeric resin is a general purpose grade polystyrene, which may be clear virgin resin, reground resin or recycled resin. Most preferably, the resin binder comprises clear reground or recycled general purpose grade polystyrene resin.

About 100 parts by weight of the resin binder is dissolved in a suitable organic solvent in order to carry the coating components uniformly through the composition. The amount of solvent used may be selected by the formulator of the liquid composition in order to provide the desired amount of solids, thickness, drying time, etc., in the formulated composition. Preferably, the solvent is present at about 150 to 400 phr, more preferably, at about 180 to 350 phr, and most preferably at about 250 to 300 phr. Persons skilled in the art will be able to easily select an appropriate solvent for the particular binder resin used. Some solvents which are commonly used include methylene chloride, ethylene chloride, trichloroethane, chlorobenzene, acetone, ethyl acetate, propyl acetate, butyl acetate, isobutyl isobutyrate, benzene, toluene, xylene, ethyl benzene, and cyclohexanone. If acrylics or acrylates are used in a mixture with the styrene polymer, it may be helpful to use a co-solvent such as tetrahydrofuran to increase the solubility of both resins in the liquid composition. Preferred solvents include aromatic hydrocarbons such as chlorobenzene, benzene, toluene, xylene, and ethyl benzene.

The plasticizer may be liquid or solid, and is preferably present in an amount sufficient to increase the toughness and flexibility of the film coating. The film coating is more flexible and elastic than the masonry structure substrate. A non-limiting list of useful plasticizers for the present invention include butyl stearate, dibutyl maleate, dibutyl phthalate, dibutyl sebacate, diethyl malonate, dimethyl phthalate, dioctyl adipate, dioctyl phthalate, butyl benzyl phthalate, benzyl phthalate, octyl benzyl phthalate, ethyl cinnamate, methyl oleate, tricresyl phosphate, trimethyl phosphate, tributyl phosphate and trioctyl adipate. Persons skilled in the art will be able to select the type and requisite combination of properties needed in the plasticizer to modify the binder resin. Preferred plasticizers include liquid phthalate plasticizers such as dioctyl phthalate, diethyl phthalate, butyl benzyl phthalate (SANTICIZER™ 160), benzyl phthalate, and octyl benzyl phthalate (SANTICIZER™ 261).

Preferably, the plasticizer is included in the liquid composition at about 0 to 50 phr, depending upon the nature of the resin binder and the desired toughness, elasticity, and related properties in the dried film. More preferably, the plasticizer is included at about 5 to 30 phr, and most preferably, it is present at about 10 to 20 phr.

The filler component of the composition is useful to increase the strength of the resulting film layer. The filler also decreases the amount of the more expensive binder resin needed in the composition, increases the bulk and weight of the resulting film, and otherwise modifies the physical properties of the film and film forming composition. The major modifications which can be achieved with fillers are changes of color or opacity, changes of density, increase of solids content, change of rheology, increase in stiffness or modulus of the coating, and changes in the affinity of the coating for various adhesives, cements, mortars, and the like. A non-limiting list of useful fillers for the present invention include carbonates, clays, talcs, silicas including fumed silica and amorphous silica, silicoaluminates, aluminum hydrate, oxides (zinc or magnesium), silicates (calcium or magnesium), sand, cement powder, mortar powder, and the like. Preferred fillers include magnesium silicate, fumed silica, sand, and cement powder.

Preferably, the filler is included in the liquid composition at about 0 to 200 phr, depending upon the nature of the resin binder and the desired toughness, elasticity, and compatibility of the dried film. More preferably, the filler is included at about 50 to 150 phr, and most preferably, it is present at about 60 to 100 phr.

Particulate solids useful in the present invention are pigments and opacifying agents. These components are useful to impart color to the composition to allow the user to determine coverage of the structure and to render the film coating relatively impervious to UV light. Thus, the pigments and opacifying agents can help to protect the film from UV degradation. Pigments and opacifying agents can be powders, lakes, metal flakes, and the like. A non-limiting list of useful pigments and/or opacifying agents for the present invention include titanium dioxides; iron lakes; iron oxide such as vermillion red, yellow and black; and the like. Preferred pigments and opacifying agents include titanium dioxide, iron oxides, and iron lakes.

Preferably, the particulate solid pigments and opacifying agents are included in the liquid composition at about 0 to 100 phr. More preferably, the particulate solids are included at about 1 to 25 phr, and most preferably, they are present at about 1 to 10 phr. If the particulate solid pigments and/or opacifiers are present at too great an amount, the film will prematurely skin over and the solids may settle and cake. The resulting film will be of poorer quality.

The liquid composition may be prepared by combining the binder resin and organic solvent in a vessel and allowing the components to rest undisturbed overnight. The resin/solvent combination can then be mixed for about 30 minutes. The mixture should be relatively clear to indicate a high level of dissolution of the resin in the solvent. Increasing opacity of the mixture signals a high level of plasticizer or other polymers in the mixture.

Plasticizers, fillers, pigments, etc., can then be added and mixing continued for about 45 minutes or until the liquid mixture appears creamy and all particles within the mixture appear to be uniform when viewed through a falling film of the mixture. Of course, adding mild heat to the mixing vessel will decrease mixing time necessary, and beginning agitation immediately will eliminate the need to allow the resin/solvent combination to rest overnight. However, agitation will generally exceed 30 minutes.

The liquid composition is relatively viscous, preferably passing through a ⅜ inch aperture of a 3¼ ounce full radius viscosity cup in about 12–20 seconds at 60° F. and, more preferably, about 15–20 seconds at 60° F., and has a solids content of about 35 to 65 wt-%, and forms a film having an average water vapor permeability of less than about $1*10^{-2}$ perms-inch. More preferably, the solids content is about 40 to 55 wt-%, and the average water vapor permeability is less than about $8*10^{-3}$ perms-inch. Most preferably, the solids content is about 50 wt-%, and the permeability is less than about $6*10^{-3}$ perms-inch.

Application of the Coating Composition

The coating composition can be applied to the exterior of any below grade masonry structure, or it can be applied to the interior of a structure such as below grade masonry walls, ceilings, etc., in basements, tunnels, retaining walls, cement posts, and the like, or elsewhere as discussed above. In coating foundations, the composition is applied on the exterior of the below grade structure prior to backfilling. The exterior coating using the composition of present invention of the structure resists water pressure and provides a waterproof coating to keep the interior of the masonry structure dry and relatively free of aqueous-induced degradation of reinforcing steel structures. In addition, the coating greatly reduces interior humidity in basements of structures. Interior coatings of masonry walls, ceilings, etc., using the composition of present invention strongly adhere to the masonry substrate to resist hydrostatic pressure and effloresce which often destroys paints and coatings on many below grade masonry surfaces.

The liquid coating composition can be applied by rolling, brushing, spraying, spraying and backrolling, etc. Preferably, the coating is applied by transfer pump at about two to three gallons/minute from a container to the surface of the structure followed by rolling or brushing as with standard waterproofing paints. After application, the coating can dry rapidly under average ambient conditions. However, in extreme cold temperatures or high humidity, the drying of the coating can be more prolonged. Generally, under moderate humidity in the shade at about 70° F., a coating having a wet thickness of about 35 mils will dry to a non-tacky, non-fluid state in about 4 hours. Upon drying, the coated composition can be backfilled without damaging the waterproof coating. At the other extreme, under winter conditions of about 25° F. and low humidity, the same coating will dry in about 12 hours (overnight).

Imperfections and damage in the resulting dried coating can be simply repaired by application of additional liquid composition over the area to be repaired. The solvent carrier remelts the underlying coating, and the repaired area dries to form a continuous film. This is in marked contrast to prior art systems and most paints which form layers with repeated applications.

To repair the dried coating from the interior of a structure, a small hole can be drilled through the structure from the inside, and a sufficient amount of the liquid composition to saturate the repair area can be pumped through the hole to the exterior surface of the structure. The liquid composition will remelt the original coating and will reform a continuous waterproof coating over the exterior surface of the structure. After the repair is complete, the drilled hole can be refilled and patched from the interior of the structure.

Filler Composition

The filler composition comprises a polystyrene resin binder and an inorganic filler in an organic solvent. The resin binder and organic solvent may be as discussed above. The inorganic filler is preferably added to the composition as a powder or larger particulate solid. A non-limiting list of useful inorganic fillers for the present invention include portland cement, natural cement, mortar, sand, and crushed aggregate. The filler composition generally comprises about 100 parts by weight of the resin binder, about 50 to 200 phr of the inorganic filler and sufficient organic solvent to form a paste. In a preferred embodiment, filler composition comprises about 75 to 150 phr of the inorganic filler and about 80 to 250 phr of the organic solvent, and more preferably, the filler comprises about 100 to 120 phr of the inorganic filler and less than about 180 phr of the organic solvent. The filler composition can be applied by trowel, roller, brush, caulk gun, or other processes normally used for applying heavy mastics and slurries. The filler composition has a solids content of at least about 60 wt-% and more preferably about 80 to 90 wt-%.

In coating the filler composition with the coating composition, the organic solvent can remelt the resin binder to form a strong joint between the filler and coating compositions. The filler composition can be coated with the waterproofing/sealing composition essentially immediately or as soon as the filler composition attains a non-tacky state.

EXAMPLES

The following specific examples can be used to further illustrate the invention. These examples are merely illustrative of the invention and do not limit its scope.

EXAMPLE 1

86.61 gals of a liquid coating composition was prepared from the following materials:

| Component | Quantity |
| --- | --- |
| Polystyrene resin (DISCOVER* GPPS OPS regrind) | 100 lbs. |
| Xylene | 40 gal. |
| Dioctyl phthalate plasticizer (DOP - Eastman Kodak) | 2 gal. |
| Magnesium silicate (MISTRON from Cyprus Industrial Minerals) | 50 lbs. |
| Titanium dioxide | 3 lbs. |
| Iron oxide | 4 oz. |

*Discover Plastics, Inc., Minneapolis, MN

The liquid coating composition was prepared by combining the binder resin and organic solvent in a vessel and allowing the components to rest undisturbed overnight. The next morning, the combination was mixed for about 30 minutes until clear, and the remaining ingredients were added. Agitation continued for about 45 minutes until the liquid mixture appeared creamy. All particles within the mixture appear to be uniform when view through a falling film of the mixture.

The samples were prepared by spraying a test coating to the foil face of polyisocyanurate sheet-type insulation board. Four 2'×2' samples were prepared and identified as "A"–"D".

The actual thickness of the material varied within each individual sheet and within each 3" diameter specimen. Specimens cut from the "A" sample averaged from 5 to 20 mils. Specimens cut from the "B" sample averaged from 10 to 17 mils. Specimens from samples "C" and "D" averaged from 4 to 40 mils.

The specimens tested were selected from three thickness groups: 6 to 7 mil average thickness, 9 to 10 mil average thickness and 38 to 40 mil average thickness.

SUMMARY OF RESULTS

| Thickness Group | Method | Average Permeance, Perms (Grains/(hr*ft²*in Hg)) | Average Permeability, Perms*in |
| --- | --- | --- | --- |
| 6–7 mils | Desiccant | 0.46 | 0.0030 |
| | Water | 0.56 | 0.0036 |
| 9–10 mils | Desiccant | 0.30 | 0.0028 |
| | Water | 0.45 | 0.0046 |
| 38–40 mils | Desiccant | 0.14 | 0.0054 |

DATA

| Thickness Group | Method | Specimen Number | Permeance, Perms, (Grains/(hr*ft² in Hg)) | Permeability, Perms*in |
| --- | --- | --- | --- | --- |
| 6–7 mils | Desiccant | 1 | 0.32 | 0.0023 |
| | | 2 | 0.60 | 0.0036 |
| | | Average | 0.46 | 0.0030 |
| | Water | 1 | 0.53 | 0.0033 |
| | | 2 | 0.65 | 0.0043 |

|  |  |  | 0.50 | 0.0033 |
|---|---|---|---|---|
|  |  | 3 | 0.50 | 0.0033 |
|  |  | Average | 0.56 | 0.0036 |
| 9–10 mils | Desiccant | 1 | 0.29 | 0.0028 |
|  |  | 2 | 0.27 | 0.0025 |
|  |  | 3 | 0.28 | 0.0025 |
|  |  | 4 | 0.34 | 0.0034 |
|  |  | Average | 0.30 | 0.0028 |
|  | Water | 1 | 0.45 | 0.0046 |
| 38–40 mils | Desiccant | 1 | 0.15 | 0.0057 |
|  |  | 2 | 0.13 | 0.0050 |
|  |  | Average | 0.14 | 0.0054 |

OBSERVATIONS

The water vapor "permeance", measured in "perms", is the time rate of water vapor transmission through unit area of a flat material induced by a vapor pressure difference between two specific surfaces, under specified temperature and humidity conditions. The thickness of a material is not factored into a measure of "permeance". Thus, the "perms", or the rate of water vapor transfer, is decreased as the specimen thickness is increased.

The water vapor "permeability" is the time rate of water vapor transmission through unit area of flat material of unit thickness induced by unit vapor pressure difference between two specific surfaces, under specific temperature and humidity conditions. "Permeability" is the arithmetic produce of permeance and thickness.

TEST METHODS

The water vapor transmission test was conducted in accordance with ASTM E96-90, "Standard Test Methods for Water Vapor Transmission of Materials." The test was conducted using both the dry-cup and wet-cup methods at conditions of 73 F and 50% RH. Several 2.8" diameter specimens from each sample group were tested. Each specimen was sealed, suing a rubber gasket or wax, in an aluminum water vapor transmission test cup containing dried anhydrous calcium chloride or deionized water. The test assemblies were placed in a Blue M model FR-446PF-2 calibrated environmental chamber, serial number F2-809, with conditions set at 73°+2° F. and 50+2% RH. Weight gain was monitored daily up until steady-state vapor transfer was achieved. The permeance for each specimen was calculated based on computer-generated graphs of the steady-state vapor transfer.

EXAMPLE 2

Fifty-five gallons of a liquid coating composition are prepared from the following materials:

| Component | Quantity |
|---|---|
| Polystyrene resin (DISCOVER* GPPS OPS regrind) | 95 lbs. |
| Acrylic resin (ELVACITE ™ #2010 duPont) | 5 lbs. |
| Xylene | 38 gal. |
| Tetrahydrofuran | 2 gal. |
| Dioctyl phthalate plasticizer (DOP - Eastman Kodak) | 2 gal. |
| Magnesium silicate (MISTRON from Cyprus Industrial Minerals) | 50 lbs. |
| Titanium dioxide | 3 lbs. |
| Iron oxide | 4 oz. |

*Discover Plastics, Inc., Minneapolis, MN

The liquid coating composition is prepared by combining the polystyrene resin and xylene solvent in a vessel and allowing the components to rest undisturbed overnight. The next morning, the combination is mixed for about 30 minutes until clear. The acrylic resin is dissolved in tetrahydrofuran and added to the polystyrene-xylene mixture. The remaining ingredients are added under agitation beginning with the plasticizer, and the complete mixture is agitated for about 45 minutes until the liquid mixture appeared creamy. All particles within the mixture appear to be uniform when view through a falling film of the mixture. Viscosity is checked with a 3¼ oz. cup having a ⅜" aperture. The cup empties in about 15–17 seconds at 60° F., and 12–16 seconds at 70° F.

The foregoing description, examples and data are illustrative of the invention described herein, and they should not be used to unduly limit the scope of the invention or the claims. Since many embodiments and variations can be made while remaining within the spirit and scope of the invention, the invention resides wholly in the claims herein after appended.

What is claimed is:

1. A method of waterproofing a rigid structural unit comprising the steps of:

(a) applying to at least one surface of a rigid structural unit a liquid composition in an organic solvent vehicle comprising a binder resin consisting essentially of a mixture of a styrene homopolymer and a styrene copolymer; and (b) solidifying the liquid composition to form a continuous film;

wherein the continuous film adheres to and is more flexible than said surface of the rigid structural unit.

2. The method of claim 1 which further comprises burying the structural unit.

3. The method of claim 1 wherein the styrene copolymer is selected from the group consisting of styrene-butadiene and styrene-isoprene.

4. The method of claim 1 wherein the continuous film binds to said surface of the structural unit and the film has an average water vapor permeance of less than about $1*10^{2-2}$ perms-inch.

* * * * *

UNITED STATES PATENT AND TRADEMARK OFFICE
CERTIFICATE OF CORRECTION

PATENT NO. : 5,624,714

DATED : April 29, 1997

INVENTOR(S) : John H. Gaveske

It is certified that error appears in the above-identified patent and that said Letters Patent is hereby corrected as shown below:

On the title page:

Item [52], please delete "June 6, 1994, abandoned," and substitute therefore --June 10, 1994 now U.S. Patent 5,482,737--

On column 1, line 5, please delete "June 6, 1994, now abandoned" and substitute therefore --June 10, 1994, now U.S. Patent 5,482,737--

On column 10, line 57 (claim 4), please delete "$1*10^{2-2}$" and substitute therefore --$1*10^{-2}$--

Signed and Sealed this

Thirty-first Day of March, 1998

*Attest:*

BRUCE LEHMAN

*Attesting Officer*     *Commissioner of Patents and Trademarks*